United States Patent [19]

Klüsters et al.

[11] Patent Number: 5,358,726
[45] Date of Patent: Oct. 25, 1994

[54] PROCESS FOR THE STABILIZATION OF HOP PRODUCTS

[75] Inventors: Paul Klüsters, Pfaffenhofen; Jan Cully, Garching, both of Fed. Rep. of Germany

[73] Assignees: SKW Trostberg Aktiengesellschaft, Trostberg; Fromm, Mayer-Bass GmbH, München, both of Fed. Rep. of Germany

[21] Appl. No.: 105,897

[22] Filed: Aug. 11, 1993

[30] Foreign Application Priority Data

Aug. 13, 1992 [DE] Fed. Rep. of Germany ....... 4226811

[51] Int. Cl.$^5$ ............................ A23L 3/00; C12C 3/00
[52] U.S. Cl. .................................. 426/242; 426/241; 426/465; 426/600
[58] Field of Search .............. 426/235, 241, 600, 242, 426/465

[56] References Cited

U.S. PATENT DOCUMENTS 3,969,196  7/1976  Zosel .
4,123,561  10/1978  Grant .
4,758,445  7/1988  Klüsters ................... 426/600
5,002,784  3/1991  Paré et al. .

FOREIGN PATENT DOCUMENTS 1381157  3/1988  U.S.S.R. .
2015569  9/1979  United Kingdom .
2085027  4/1982  United Kingdom .

OTHER PUBLICATIONS

Orbit Database, Orbit Acc. No. 75–07623w, Abstracting German Patent Application 1442105, Jan., 1969.
World Patent Index Abstract No. 78–00302A/01.

*Primary Examiner*—Donald E. Czaja
*Assistant Examiner*—Curtis E. Sherrer
*Attorney, Agent, or Firm*—Felfe & Lynch

[57] ABSTRACT

In order to stabilize hop products by drying at a circulating air temperature of 60° to 80° C. to a residual moisture content of the dried hop products of between 12 and 14% by weight, the hop product is subjected after drying to a short period of thermal irradiation or to a temperature treatment at 60° to 90° C. under inert gas conditions.

13 Claims, No Drawings

PROCESS FOR THE STABILIZATION OF HOP PRODUCTS

Field of the Invention

The present invention concerns a process for the stabilization of hop products subsequent to a conventional drying procedure.

Hop products within the meaning of the invention are understood as hops, hop pellets, hop powder and hop extracts which contain humulones.

BACKGROUND OF THE INVENTION

Hop products have been used for about 2000 years to embitter beer. α-bitter acids, the so-called humulones, are constituents of hop resin and act as the main mediators of the bitter hop component. These cyclohexadienone derivatives, which are present in special cell compartments of the fruit bodies of hop umbels, are natural antibiotics and serve the hop plant as protection against being eaten.

The hop processing industry has in recent times utilized processes for the selective isolation and concentration of these special hop constituents not least for reasons of rationalization for the breweries. Developments in the field of hop processing such as drying and pellet pressing have above all provided the basis for the production of hop extracts by means of supercritical carbon dioxide.

In this process the less mild processing methods of hop powder production prior to the subsequent extraction procedure inter alia cause destruction of the natural compartmentation of various cell constituents. In hops this results above all to a substantial decrease in the humulone content that is partially caused by enzymes and can be up to 40% even under inert gas cover. In addition to the known losses of humulones by atmospheric oxygen-dependent oxidative processes, it is especially the aforementioned losses caused by processing under protective gas and the concomitant shortening of storage periods that still cause problems.

Thus German Offenlegunschrift 28 08 981 teaches a process for the production of hop pellets with a lowered water content in which a stream of air having 2 to 7% humidity and a maximum of 50° C. is passed over the pellets in a second drying process. The object of the process is to stabilize the specific hop constituents by lowering the water content of the pellet; however, when the pellets are subsequently cooled to ambient temperature the pellets again take up atmospheric humidity which partially abolishes the previously attained stabilizing effect.

German Offenlegunschrift 26 27 534 also describes the advantage of the hop extract relative to other processing methods as a lowered water content down to 0 to 10%. However, this drying method makes use of the controversial solvent extraction method (methylene chloride) with all its known drawbacks. In the conventional process of mild hop drying with the object of an optimal yield of α-bitter acids, the hop umbels are dried at 60° to 80° C. circulating air temperature to an average residual moisture content of 12 to 14%. Due to the natural microbicidal action of the α-bitter acids obtained in this manner they largely evade destruction by microorganisms and accordingly should be stable when stored under conditions free of atmospheric oxygen.

It is above all the extraction of the bitter hop constituents by means of supercritical carbon dioxide which has essentially resulted in an appropriate treatment of hops for foodstuffs followed by increased extract yields. The advantages of $CO_2$ extraction such as a multiple increase in the uptake of the substance to be extracted by the selective inert gas carbon dioxide or the simplified and residue-free separation of extracted substance and carrier gas are described in detail in German patent 14 93 190.

Nevertheless, it has been shown that the humulone contents in hop pellets and also in extracts are subject to a partially non-oxidative or indirect-oxidative temperature-dependent decrease.

Although processes have been described which are intended to protect hop products above all from humulone losses, these methods have without exception the drawback that they require the addition of auxiliary agents. According to German Offenlegunschrift 28 33 589 α-acids are protected against decomposition by admixing the hop extract with 1 to 3% by weight metal oxides such as calcium oxide and/or magnesium oxide whereby this hop mixture is subjected at the same time to an increase in temperature and pressure. This procedure is combined with the addition of small amounts of lower alcohols or mixtures thereof. German patent 31 39 541 teaches a process for the protection of hops by the addition of 0.4% of the antioxidative ascorbic acid.

OBJECTS OF THE INVENTION

The object of the present invention is therefore to avoid the disadvantages of the cited processes and to create a mild process which can be used as a non-invasive protection method for humulones in hop products such as hop umbels, powder, pellets or extract from degradation processes.

DESCRIPTION OF THE INVENTION

This object is achieved according to the present invention by a process for the stabilization of hop products by drying at a circulating air temperature of 60° to 80° C. to a residual moisture content of the dried hop product of between 12 and 14% by weight which is characterized in that after drying, the hop product is subjected to a short period of thermal irradiation or to a temperature treatment at 60° to 90° C. under inert gas conditions.

Surprisingly it turned out in the process according to the present invention that a short after treatment of hop material which was pre-dried in the usual manner allows the residual moisture content which has previously at best been about 12% to now fall to only 3 to 5% which in addition generates a considerably increased quality and stability of the hop products.

U.S. Pat. No. 5 002 784 already describes a process for the extraction of natural products which is coupled with a simultaneous microwave irradiation. However, the microwaves serve in this case to improve and thus to increase the release of plant constituents during the extraction process, but hops are not mentioned here.

In the previously utilized drying processes the temperature inside the hop umbels is max. 50° C.; depending on the treatment period and the underlying "residual moisture" the present process reaches temperatures of 40° to 90° C., preferably 45° to 60° C. during thermal irradiation such as microwave or infrared treatment.

In the present case thermal treatment at 60° to 90° C. with dry inert gas as well as irradiation with microwaves or infrared light results in an increase in the storage life of hop products which is based on a significant increase in the stability of humulones. In this process the treatment periods according to the present invention are preferably between 30 seconds and 10 minutes, in particular 2 to 5 minutes. Experiments to determine the optimal irradiation conditions have shown that in the case of microwave treatment as well as for treatment with infrared light the most suitable frequency ranges are between 1500 and 30000 MHz, preferably at 2000 to 20000 MHz. For thermal treatment with dry inert gas the moisture content of the treatment stream should be between 1 and 3% by weight and not exceed 5% by weight.

The following experiments are intended to illustrate the treatment parameters of the process according to the present invention and the resulting increased stability of the humulones.

EXAMPLES

In each case 50 g hop umbels from the 1991 harvest—dried according to a conventional method at a temperature of 70° C. to the commercial level of about 12% by weight residual moisture—were subjected to an additional thermal treatment:

EXAMPLE 1

Type of treatment: microwave
Frequency f: 2450 MHz
Treatment duration: 2 minutes
Heat current Φ:
  sample A 90 watts
  sample B 360 watts
  samples C and D 600 watts each

EXAMPLE 2

Type of treatment: dry nitrogen stream
Temperature: 70° C.
Treatment duration 4 minutes
Atmospheric humidity of the treatment stream: 5% by weight
Sample E, F The hop samples treated in this manner as well as the control samples that were not after-treated were subsequently stored airtight at a constant circulating air temperature of 60° C. At the stated storage times the humulone contents were determined by means of HPLC taking into consideration the different moisture contents.

TABLE

| Storage period (h) | percentage humulone content in % by weight of the sample | | | | | | |
|---|---|---|---|---|---|---|---|
| | 0 = control | Example 1 | | | | Example 2 | |
| | | A | B | C | D | E | F |
| *'Hersbrucker hops'* ($a_{start}$: 3.72 dry basis) | | | | | | | |
| 0 | 100.0 | 100.0 | 100.0 | 100.0 | — | — | — |
| 30 | 54.8 | 65.1 | 73.7 | 71.8 | — | — | — |
| 120 | 45.4 | 49.2 | 48.9 | 52.2 | — | — | — |
| residual moisture (% by weight) | — | 8.7 | 4.3 | 2.6 | — | — | — |
| *'Nordbrauer hops'* ($a_{start}$: 11.29 dry basis) | | | | | | | |
| 0 | 100.0 | 100.0 | 100.0 | 100.0 | — | 100.0 | — |
| 30 | 69.0 | 70.3 | 76.6 | 75.1 | — | 73.8 | — |
| 120 | 59.6 | 67.8 | 66.4 | 67.1 | — | 65.5 | — |
| residual moisture (% by weight) | — | 8.6 | 3.9 | 3.1 | — | 4.7 | — |
| *'Nordbrauer hops'* ($a_{start}$: 8.76 dry basis) | | | | | | | |
| 0 | 100.0 | — | — | — | 100.0 | — | 100.0 |
| 48 | 69.4 | — | — | — | 82.4 | — | 77.2 |
| residual moisture (% by weight) | — | — | — | — | 3.6 | — | 5.1 |

We claim

1. In the method of stabilizing a hop product by drying said hop product in circulating air at a temperature of 60° to 80° C. until the residual moisture content of the dried hop product is between 12 and 14% by weight, the improvement which comprises subjecting the said dried hop product for 30 seconds to 10 minutes to a thermal irradiation at 40° to 90° C. in an inert gas atmosphere.

2. The method of claim 1, wherein said hop product is selected from the group consisting of hops, hop umbels, hop pellets, hop powder and hop extracts.

3. The method of claim 1, wherein the thermal irradiation time is 2 to 5 minutes.

4. The method of claim 1, wherein said thermal irradiation is effected by means of a microwave source.

5. The method of claim 1, wherein said thermal irradiation is effected by means of an infrared source.

6. The method of claim 1, wherein said hop product is subjected to thermal irradiation at 60° to 90° C.

7. The method of claim 1, wherein said hop product is subjected to thermal irradiation at 45° to 60° C.

8. The method of claim 4, wherein the frequency of said microwave source is 1,500 to 30,000 MHz.

9. The method of claim 4, wherein the frequency of the microwave source is 2,000 to 20,000 MHz.

10. The method of claim 5, wherein the frequency of the infrared source is 1,500 to 30,000 MHz.

11. The method of claim 5, wherein the frequency of the microwave source is 2,000 to 20,000 MHz.

12. The method of claim 1, wherein the inert atmosphere has a relative humidity that does not exceed 5% by weight.

13. The method of claim 1, wherein the inert atmosphere has a relative humidity that is between 1 and 3% by weight.

* * * * *